(12) United States Patent
Pan et al.

(10) Patent No.: US 9,419,779 B2
(45) Date of Patent: Aug. 16, 2016

(54) FULL-DUPLEX DRIVER WITH HYBRID ADAPTATION

(71) Applicant: Broadcom Corporation, Irvine, CA (US)

(72) Inventors: Hui Pan, Coto de Caza, CA (US); Mostafa Mohammad Hany Ali Hammad, Irvine, CA (US); Yuan Yao, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 326 days.

(21) Appl. No.: 14/038,928

(22) Filed: Sep. 27, 2013

(65) Prior Publication Data

US 2015/0071136 A1  Mar. 12, 2015

Related U.S. Application Data

(60) Provisional application No. 61/874,816, filed on Sep. 6, 2013.

(51) Int. Cl.
| | | |
|---|---|---|
| *H04B 1/38* | (2015.01) | |
| *H04L 5/16* | (2006.01) | |
| *H04L 5/14* | (2006.01) | |
| *H04B 3/23* | (2006.01) | |
| *H04L 25/02* | (2006.01) | |

(52) U.S. Cl.
CPC .............. *H04L 5/1415* (2013.01); *H04B 3/23* (2013.01); *H04L 25/028* (2013.01); *H04L 25/0278* (2013.01)

(58) Field of Classification Search
CPC ....... H04L 25/14; H04L 25/4925; H04L 5/20; H04L 25/0272; H04L 25/49; H04L 27/04; H04B 1/04; G01S 1/68; G01S 7/282; H03B 5/34
USPC ................. 375/219–223, 229–236, 257–258, 375/286–296, 309–315
See application file for complete search history.

(56) References Cited

U.S. PATENT DOCUMENTS

| | | | | |
|---|---|---|---|---|
| 6,373,908 | B2 * | 4/2002 | Chan ....................... | H04B 1/586 375/219 |
| 6,388,605 | B1 * | 5/2002 | Petz ......................... | G01S 7/282 342/25 R |
| 6,877,043 | B2 * | 4/2005 | Mallory ................. | H04L 1/0003 709/251 |
| 7,180,951 | B2 * | 2/2007 | Chan ........................ | H04B 3/23 375/257 |
| 7,672,447 | B1 * | 3/2010 | Lindqvist ................. | H04B 3/23 379/406.08 |
| 7,778,333 | B2 * | 8/2010 | Chan ........................ | H04B 3/23 375/257 |
| 8,717,213 | B1 * | 5/2014 | Wong ....................... | H04B 1/40 341/144 |

(Continued)

*Primary Examiner* — James M Perez
(74) *Attorney, Agent, or Firm* — Brinks Gilson & Lione

(57) ABSTRACT

A system includes a full-duplex driver to drive signals on a load. A hybrid element connected with the full-duplex driver controls a flow of transmission and receipt of the signals. A gain control element connected with the full-duplex driver tunes a transconductance of the full-duplex driver to match an impedance of the load. The controlled gain is based on a leakage voltage value of the full-duplex driver.

20 Claims, 7 Drawing Sheets

(56) References Cited

U.S. PATENT DOCUMENTS

| | | | | |
|---|---|---|---|---|
| 8,942,658 B2* | 1/2015 | Banwell | H04B 1/58 343/852 |
| 2002/0101982 A1* | 8/2002 | Elabd | H04B 3/23 379/406.01 |
| 2003/0142688 A1* | 7/2003 | Chou | H04B 3/23 370/420 |
| 2004/0096005 A1* | 5/2004 | Zabroda | H04L 12/413 375/257 |
| 2005/0179473 A1* | 8/2005 | Nagahori | H04L 5/1423 327/110 |
| 2006/0018388 A1* | 1/2006 | Chan | H04B 3/23 375/257 |
| 2009/0028355 A1* | 1/2009 | Ishiguro | H04B 3/234 381/66 |
| 2010/0142699 A1* | 6/2010 | Qin | H04B 1/58 379/402 |
| 2012/0001660 A1* | 1/2012 | Gupta | H04B 1/0028 327/105 |
| 2013/0028409 A1* | 1/2013 | Li | H04M 9/082 379/406.01 |
| 2013/0294294 A1* | 11/2013 | Pan | H04B 1/586 370/276 |
| 2015/0311913 A1* | 10/2015 | Pan | H03M 1/1245 341/156 |

* cited by examiner

FULL-DUPLEX DRIVER WITH HYBRID ADAPTATION

PRIORITY CLAIM

This application claims priority to U.S. Provisional Application Ser. No. 61/874,816, filed Sep. 6, 2013, titled "Transceiver with Hybrid Adaptation," which is incorporated herein by reference in its entirety.

TECHNICAL FIELD

This disclosure relates to communication networks. This disclosure also relates to transceiver hybrid adaptations in the communication networks to reduce hybrid leakage.

BACKGROUND

High speed data networks form part of the backbone of what has become worldwide data connectivity. Within the data networks, network devices such as switching devices direct data packets from links connected through hubs, helping to eventually guide the data packets from a source to a destination.

BRIEF DESCRIPTION OF THE DRAWINGS

The innovation may be better understood with reference to the following drawings and description. In the figures, like reference numerals designate corresponding parts throughout the different views.

DETAILED DESCRIPTION

An adaptation loop, e.g., for gigabit Ethernet switches and hubs, can handle driver termination calibration, output transmit amplitude regulation against load variations, and transceiver hybrid leakage in the analog domain, in addition to a digital echo canceller handling the leakage. The methods and systems can take advantage of a full-duplex driver architecture to minimize the hybrid leakage and provide improvement in system signal-to-noise ratio (SNR) for full-duplex communications applications such as gigabit Ethernet without increasing the resolution of the receiver analog-to-digital converter (ADC). The systems and methods can also be used with simplex communications systems for active impedance matching and transmit amplitude regulation against load variations.

Figure 1:
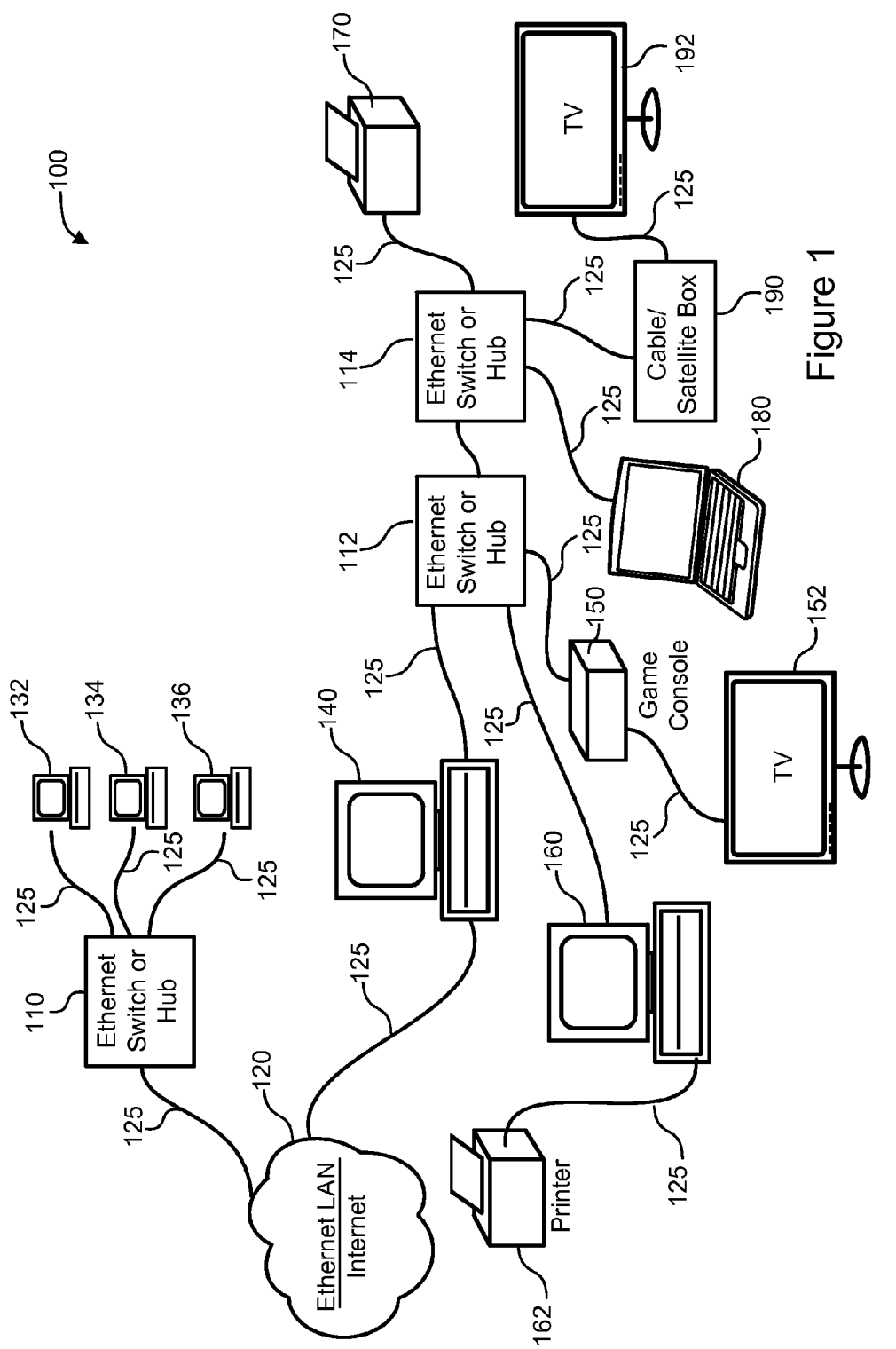
FIG. 1 is a block diagram of an exemplary communication network.

FIG. 1 is a block diagram of an exemplary communication network 100. The communication network 100 includes gigabit Ethernet local area networks (LAN's), e.g., as described in the Institute of Electrical and Electronic Engineers (IEEE) 802.3 standard. Gigabit Ethernet communications traffic can be controlled throughout the LAN's with gigabit Ethernet switches and/or hubs 110, 112, 114, hereinafter referred to as switches for the sake of convenience. The gigabit Ethernet switches 110, 112, 114 can connect with other LAN's or wide area networks (WAN's) 120, e.g., the Internet, via communication lines or cables 125, hereinafter referred to as communication lines. The gigabit Ethernet switches 110, 112, 114 can connect various link partners such as other devices or nodes, e.g., computers, cameras, printers, switches, routers, etc. to the Internet or other LAN's or WAN's via the communication line 125. The communication line 125 can be wired or wireless connections, and can include co-axial cable, twisted pair wires, etc.

Ethernet switch 110 can connect a network of computers 132, 134, 136 to the Internet. Additionally or alternatively, gigabit Ethernet switch 112 can connect to the Internet 120 via computer 140. The gigabit Ethernet switch 112 can connect with a game console 150 connected with television or monitor 152, desktop computer 160 connected with printer 162 and gigabit Ethernet switch 114. Additionally or alternatively, gigabit Ethernet switch 114 can create a network of other connected devices including a printer 170, a laptop computer 180 and/or a set-top box 190 to receive cable or satellite signals connected with television or monitor 192.

Figure 2:
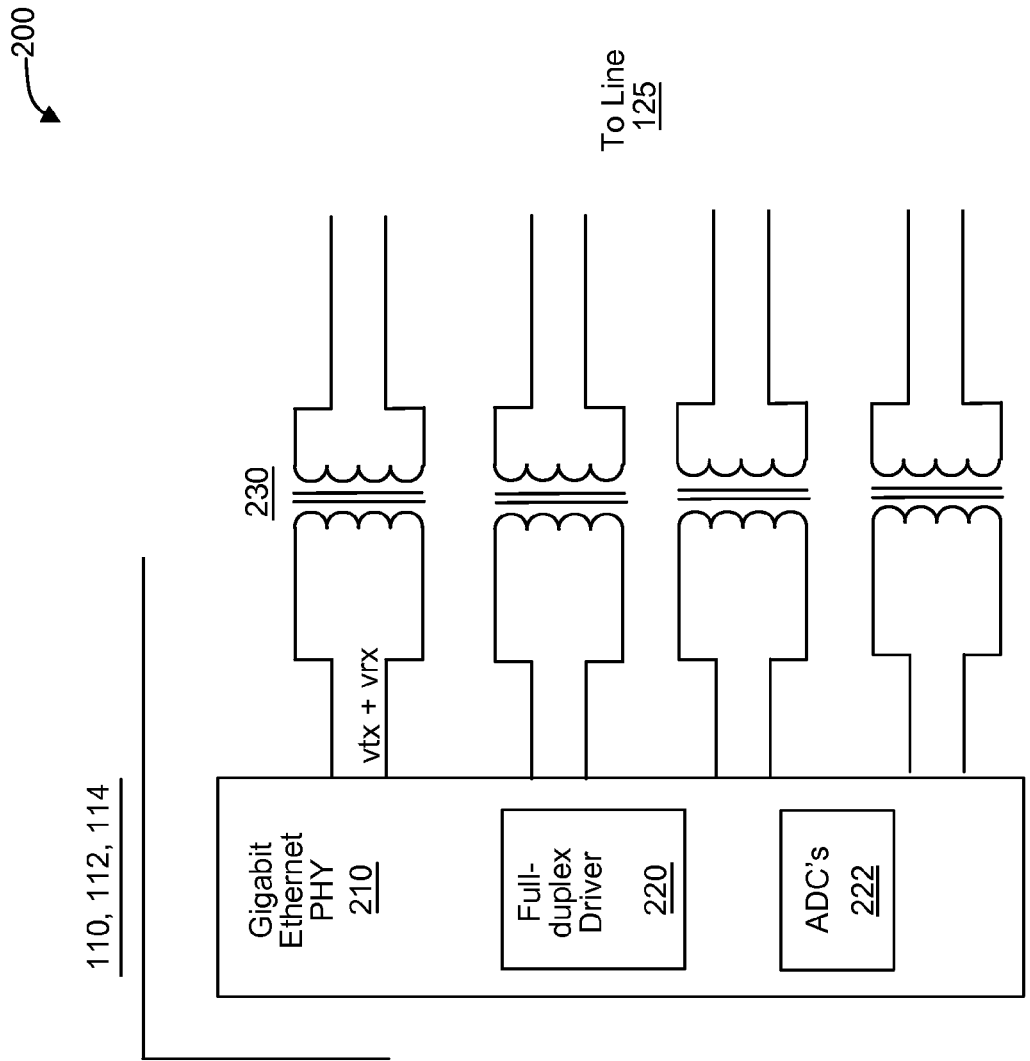
FIG. 2 is a block diagram of an exemplary physical connection of a gigabit Ethernet switch I/O port to the line.

FIG. 2 is a block diagram of an exemplary physical connection 200 of an I/O port of the gigabit Ethernet switches 110, 112, 114 to the line 125. The line 125 can include an RJ45 connector or co-axial cable connector, etc. to connect with the gigabit Ethernet switches 110, 112, 114 depending on the type of line 125 (e.g., unshielded twisted pair (UTP) CAT-5 cable) and connection to be used. The gigabit Ethernet switches 110, 112, 114 can include circuit elements for performing the signal communications, including a gigabit Ethernet PHY 210, full-duplex driver 220, or other current driver, and analog-to-digital converters (ADC's) 222 to transmit transmitter signal vtx and receive receiver signal vrx to and from the line 125 transformers/magnetics 230.

The full-duplex driver 220 can perform simultaneous functions, including sending a transmit signal vtx to the line 125 and extracting a receive signal vrx from the line 125 using a built-in hybrid. The design parameter of the full-duplex driver 220, e.g., a transconductance Gm of a closed-loop transconductor, can be tuned to maintain a constant voltage gain A against the variation of the load RL, while simultaneously the hybrid leakage from vtx is also minimized and the output impedance Ro is matched to the load RL.

Figure 3:
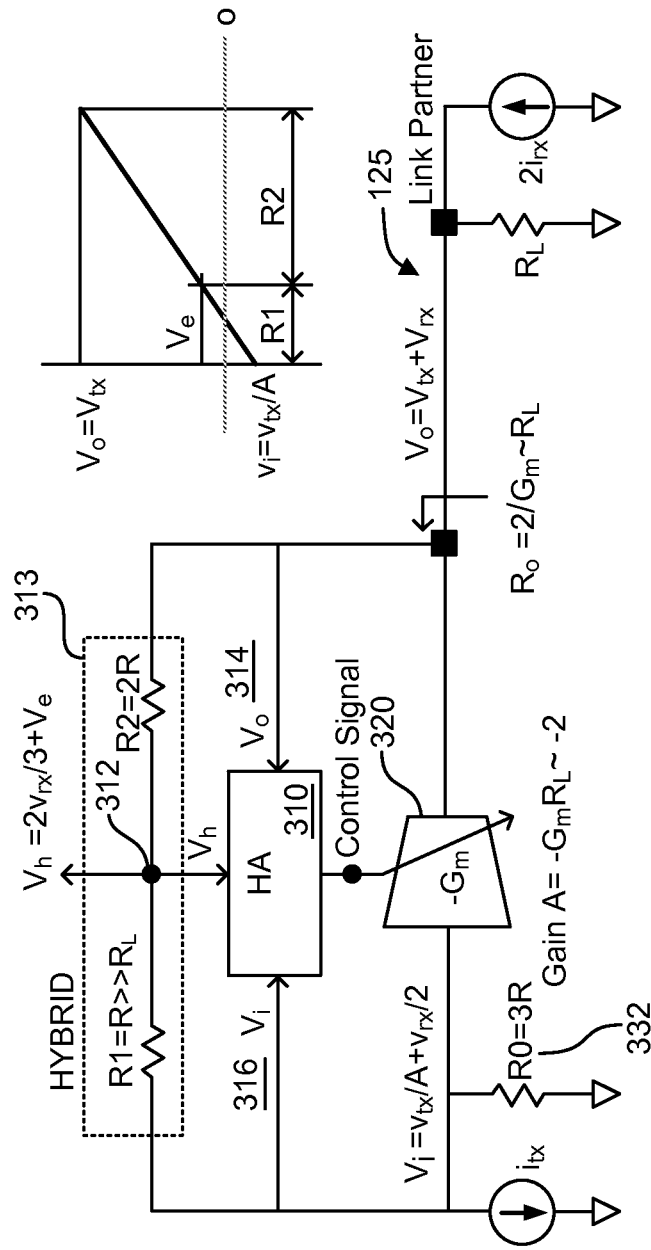
FIG. 3 is a block diagram of an exemplary full-duplex driver with hybrid adaptation.

FIG. 3 is a block diagram of an exemplary full-duplex driver 220 with a hybrid adaptation (HA) element 310. The hybrid adaption element 310 can form a feedback loop in the driver circuit to correlate the output vh 312 of the hybrid element 313 and a copy of the transmission voltage vtx generated from the Gm output vo 314 and the GM input vi 316 as vo/2-vi, to monitor the hybrid leakage ve. The hybrid element 313 provides a feedback impedance of the full-duplex driver 220 and can include a hybrid voltage vh tapped from the feedback impedance string. The HA element 310 can utilize the hybrid leakage information to output a control signal to the driver Gm 320, or other gain unit, to tune the driver Gm 320 to accommodate for load variations to minimize the hybrid leakage ve, e.g., to zero. In the graph, the hybrid leakage ve is currently greater than zero, e.g., above the zero axis, therefore the leakage ve includes a positive polarity. The hybrid leakage ve can also include a negative polarity. In either case, the HA element 310 can drive the hybrid leakage ve to or towards zero by tuning the driver Gm 320. An impedance element, e.g., resistor R0=3R or other impedance value can be added at an input of the driver Gm 320 to attenuate the input signal swing of the driver Gm 320. Swing at the driver Gm 320 input is about half of the driver Gm 320 output swing to avoid voltage headroom issues. When the HA element 310 adjusts the driver Gm 320, the hybrid leakage ve can be minimized as ve=vtx (1+2/A)/3=0 at Gain A=−GmRL=−2 or output impedance Ro=2/Gm=RL.

The HA element 310 can tune Gm to zero out the near-end echo that dominates the hybrid leakage ve. By cancelling or reducing the hybrid leakage ve in the analog domain instead of the digital domain, a dynamic range of the ADC 222 can be increased. Additionally or alternatively, when the transconductance of the driver Gm is tuned to reduce hybrid leakage ve, Gain A is about −2, therefore a transmit amplitude is independent of the load. Additionally or alternatively, an output impedance Ro of the full-duplex driver 220 can match the load impedance RL since the output impedance Ro is 2/Gm, to provide minimized reflection. Therefore, the HA element 310 can simultaneously regulate the voltage gain and match the output impedance Ro to the load impedance RL.

Figure 4:
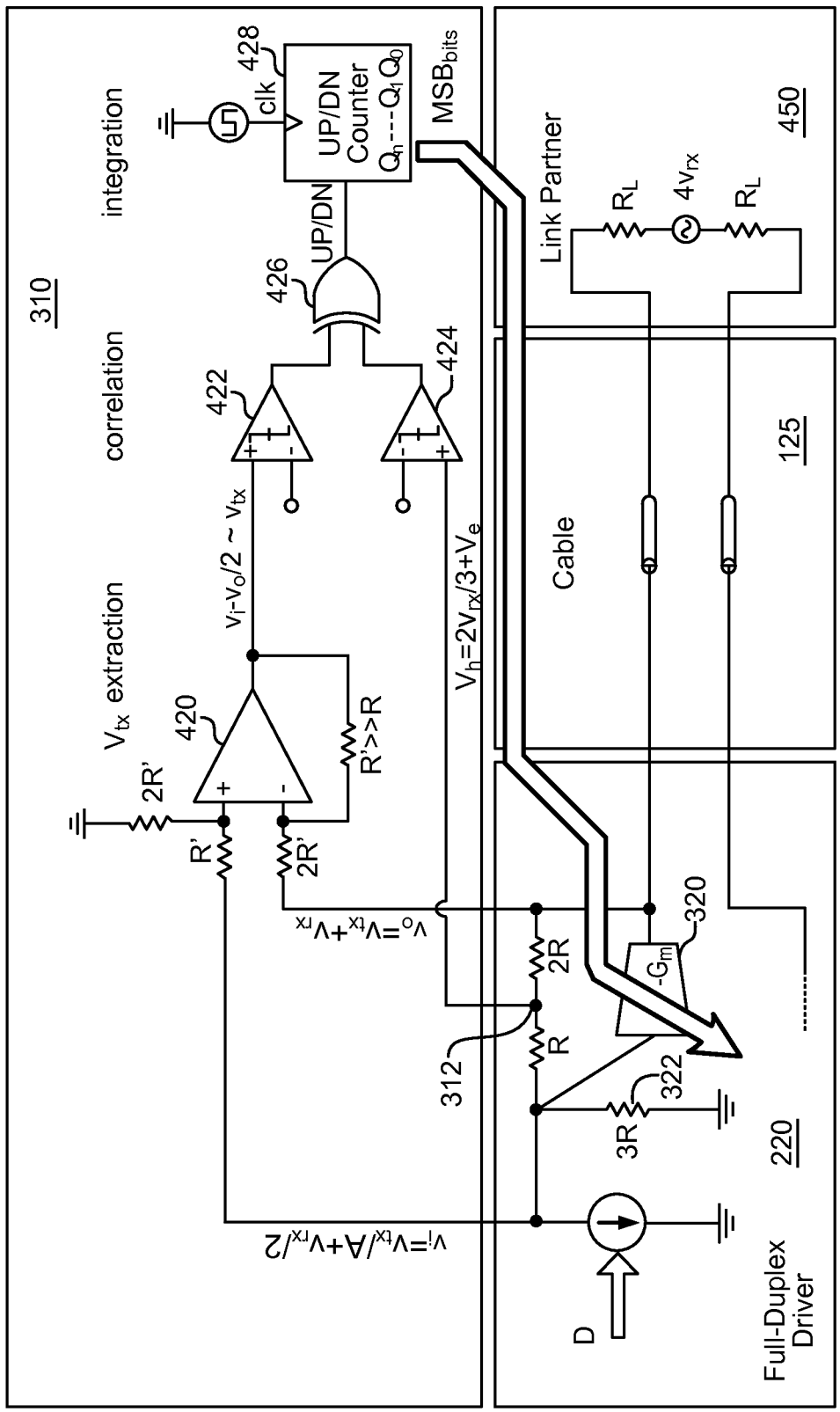
FIG. 4 is a block diagram of an exemplary circuit architecture of a hybrid adaptation element.

FIG. 4 is a block diagram of an exemplary circuit architecture of a hybrid adaptation element 310. A full-duplex driver 220 feeds the driver Gm input voltage vi and driver Gm output voltage vo to an extraction element, e.g., a difference amplifier 420, to extract transmitter voltage signal vtx, as vtx equals vi−vo/2. A comparator 422 or other polarity detector connects with an output of the difference amplifier 420 to determine if vtx is a positive or negative value by comparing it a common-mode voltage. The comparator 422 outputs a digital signal, e.g., a zero or one signal, depending on the polarity of vtx. A second comparator 424 determines a polarity of the hybrid output signal vh, and outputs a digital signal, e.g., a zero or a one signal, depending on the polarity.

The outputs of the comparator 422 and the comparator 424 connect with a correlator, e.g., an exclusive-or (XOR) gate 426. Other types of gates can be used depending on the implemented logic of the circuit. An output of the XOR gate 426 can be zero when the polarity of vtx matches the polarity of vh and can be one when the polarity of vtx does not match vh, or vice versa. The XOR gate accomplishes a correlation function between vtx and vh which is proportional to the leakage signal ve and includes the same polarity as the leakage signal ve on average. The correlation is fed to an up/down counter 428. If the up/down counter 428 keeps counting up or down the leakage ve is non-zero and is driven to zero. Starting from a nominal mid-point, the counter value counts up if the XOR output value is one and counts down if the XOR output value is zero while the hybrid leakage ve is in the opposite polarity to vtx or the same polarity as vtx, respectively. When the up/down counter 428 stops counting, e.g., the most significant bits (MSB) are not changing, the hybrid leakage ve is minimized, e.g., about zero hybrid leakage ve.

The bits of the up/down counter 428, e.g., the MSB, are outputted to the driver Gm 320. The MSB are used to digitally tune driver Gm 320 to drive the hybrid leakage voltage ve to about zero. This analog domain hybrid adaptation is a simpler implementation than handling the hybrid leakage in the digital domain, e.g., by a digital echo canceller.

The adaptation can either run continuously in the background or be turned off after convergence for a determined load. The analog adaption can lower the requirements on digital echo cancellation dynamic range and complexity and provide extra improvement in the system SNR on top of digital echo cancellation. Product advantages can include less bit error rate (BER) sensitivity to impedance variation of the cable, e.g., line 125, and link partner in the short cable cases. The driver output impedance can automatically track and adapt to the cable impedance and the transmit amplitude can remain constant.

Figure 5:
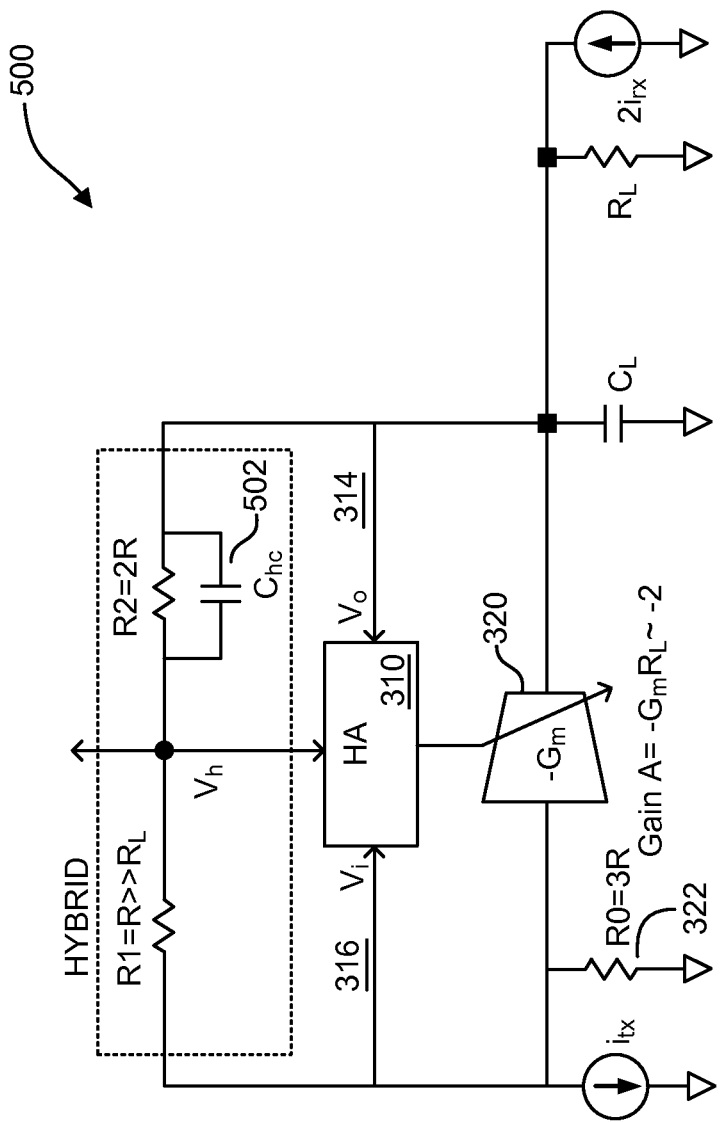
FIG. 5 is a block diagram of an exemplary circuit implementation of a compensation for hybrid frequency dependence.

FIG. 5 is a block diagram of an exemplary circuit implementation 500 of compensation for hybrid frequency dependence. The exemplary circuit 500 can compensate for a parasitic loading effect CL. The gain (A) bandwidth (BW) effect at high frequencies on the hybrid leakage ve can be compensated for by capacitor Chc 502 such that 2R*Chc=RL*CL. The capacitor Chc 502 can help adjust the hybrid interpolation ratio to match the gain dependence on frequency when the circuit implementation 500 is operating at high frequencies.

Figure 6:
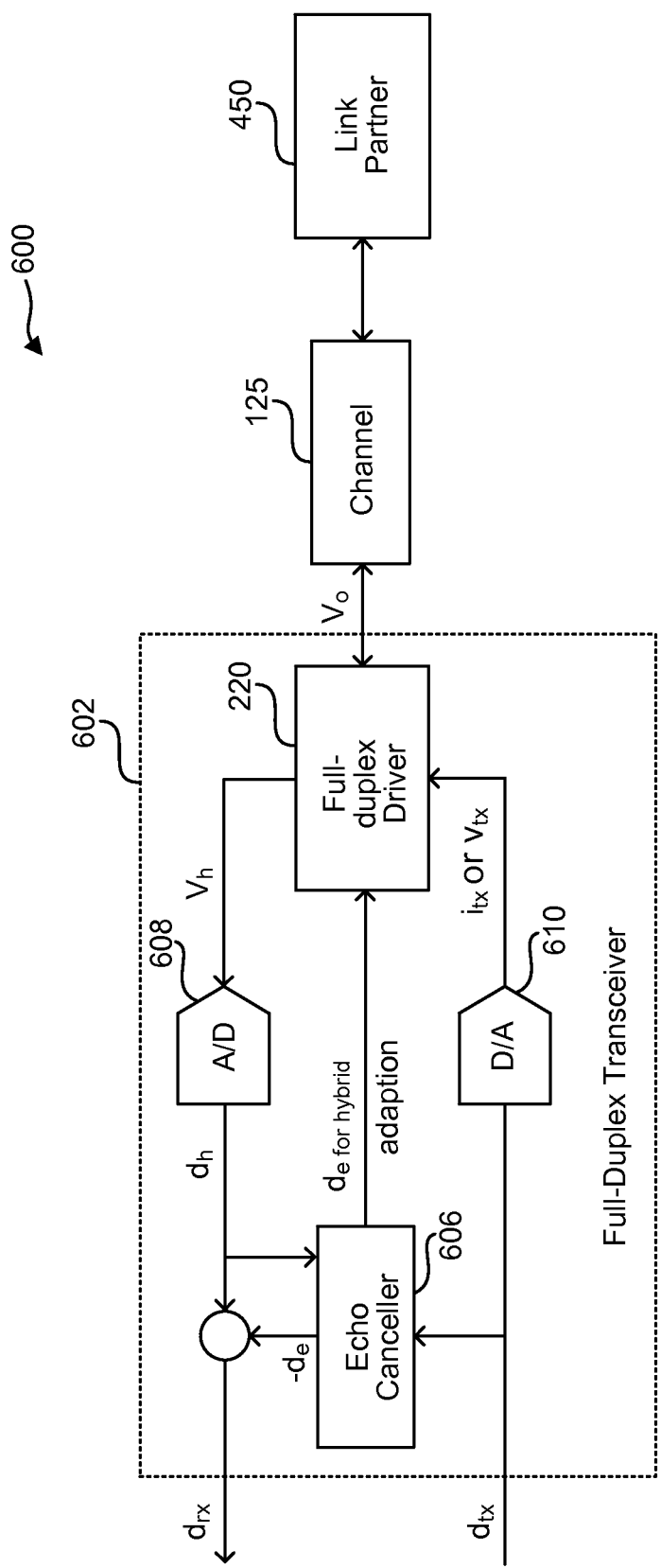
FIG. 6 is a block diagram of an exemplary circuit implementation for tuning the driver Gm using a digital hybrid leakage signal from the echo canceller.

FIG. 6 is a block diagram of an exemplary circuit implementation 600 for tuning the driver Gm using a digital hybrid leakage signal from the hybrid echo canceller 606. The full-duplex transceiver 602, or other type of transceiver, can include the full-duplex driver 220, echo canceller 606, an analog-to-digital converter 608 and a digital-to-analog converter 610. The full-duplex driver 220 connects with a load, e.g., channel 125 and link partner 450. A digital hybrid leakage d_e signal is available from the echo canceller 606 to tune the transconductance of the full-duplex driver in the analog domain. The received drx signal is the receive signal vrx in digital domain, and the transmitted signal dtx is the transmit signal vtx in digital domain, dh is the hybrid output signal vh in digital domain, and de is the hybrid leakage ve in digital domain. The digital leakage signal de can provide the polarity information used to tune the Gm to minimize the hybrid leakage.

Figure 7:
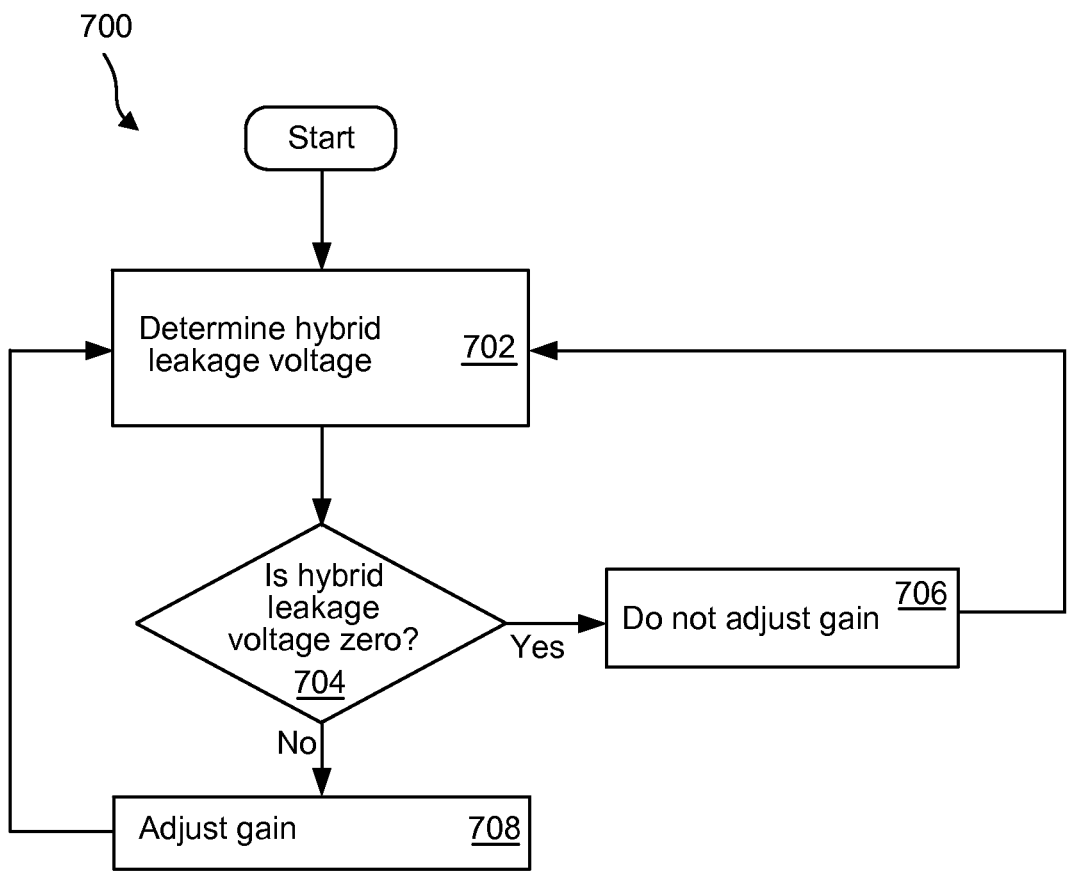
FIG. 7 is a flowchart of an exemplary logic for driving hybrid leakage voltage towards zero in the analog domain.

FIG. 7 is a flowchart of an exemplary logic 700 for driving hybrid leakage voltage towards zero in the analog domain. The hybrid leakage voltage is determined, e.g., for a transceiver (702). The hybrid leakage can be determined in a variety of way, e.g., a counter can count a number of times a polarity of a transmitter voltage differs from a polarity of a hybrid voltage and/or an echo canceller can send a signal representing the hybrid leakage voltage to the full-duplex driver, etc. (704). A value representing the hybrid leakage voltage can be sent to the full-duplex driver to tune the full-duplex driver to adjust the gain in the analog domain to drive the hybrid leakage voltage towards zero (708). If the hybrid leakage voltage is already zero, the gain need not be adjusted. When the hybrid leakage voltage is about zero, the impedance of the transceiver matches an impedance of at least one of the connected line impedance and the link partner.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The logic described above may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments of the systems and methods have been described, many more embodiments and implementations are possible within the scope of the systems and methods. Accordingly, the systems and methods are not to be restricted except in light of the attached claims and their equivalents.

What is claimed is:

1. A system, comprising:
a full-duplex driver including a closed-loop transconductor;
an extraction element connected with the full-duplex driver, the extraction element configured to determine a transmitter voltage of the full-duplex driver;
a hybrid element connected as a feedback impedance of the full-duplex driver, the hybrid element including a hybrid voltage tapped from the feedback impedance;
a correlation element, the correlation element configured to determine a polarity of a hybrid leakage voltage based on the hybrid voltage and the transmitter voltage; and
an integrator, the integrator configured to determine a value of the hybrid leakage voltage, the value of the hybrid leakage voltage and the polarity of the hybrid leakage voltage being used to tune a transconductance of the full-duplex driver to drive the hybrid leakage voltage towards zero.

2. The system of claim 1, where the integrator comprises a counter.

3. The system of claim 2, where most significant bits of the counter are inputted to the full-duplex driver to tune the transconductance of the full-duplex driver.

4. The system of claim 1, further comprising an impedance element connected to an input of the full-duplex driver, and configured to attenuate an input signal swing.

5. The system of claim 1, where a gain of the full-duplex driver is controlled to match an output impedance to a load connected with the full-duplex driver.

6. The system of claim 5, where the impedance is at least one of a line impedance and a link partner impedance.

7. The system of claim 1, further comprising a capacitor connected with the hybrid element, the capacitor to reduce a bandwidth effect on the hybrid leakage at high frequencies.

8. The system of claim 1, where the correlation element comprises an exclusive-or gate.

9. The system of claim 1, where the extraction element comprises a difference amplifier.

10. The system of claim 9, where the difference amplifier is configured to receive input voltage of the full-duplex driver and an output voltage of the full-duplex driver.

11. A system, comprising:
a full-duplex driver to drive signals on a load;
a hybrid element connected with the full-duplex driver, the hybrid element configured to control a transconductance of the full duplex driver with a feedback control signal; and
a gain control element connected with the full-duplex driver and the hybrid element, the gain control element configured to adjust a gain of the full-duplex driver to match an output impedance of the full-duplex driver to an impedance of the load based on the feedback control signal received from the hybrid element, where control of the gain with the feedback control signal is based on a hybrid leakage voltage of the hybrid element determined as a function of the transmitter voltage of the full duplex driver.

12. The system of claim 11, where the gain control element comprises an echo canceller, the echo canceller configured to send a signal representing the hybrid leakage voltage to the full-duplex driver.

13. The system of claim 11, where the gain control element comprises a counter, the counter configured to count a number of times a polarity of the transmitter voltage differs from a polarity of a hybrid voltage.

14. A system, comprising:
a full-duplex driver configured to drive signals on a load;
a hybrid element connected with the full-duplex driver, the hybrid element configured to control a flow of transmission and reception of the signals;
a gain control element connected with the full-duplex driver, the gain control element comprises a counter, the counter configured to count a number of times a polarity of a transmitter voltage differs from a polarity of a hybrid voltage, and the gain control element configured to adjust a gain of the full-duplex driver to match an output impedance to the load, where control of the gain is based on a hybrid leakage voltage of the hybrid element; and
an exclusive-or gate configured to correlate the polarity of the transmitter voltage with the polarity of the hybrid voltage.

15. The system of claim 11, where the gain control element is configured to tune the transconductance of the full-duplex driver to drive the hybrid leakage voltage towards zero.

16. A method, comprising:
extracting a transmitter voltage of a full duplex driver included in a transceiver;
measuring a hybrid voltage tapped from a feedback impedance providing a hybrid output signal of the full duplex driver;
determining a hybrid leakage voltage of the transceiver based on the transmitter voltage of the full duplex driver included in the transceiver and the hybrid voltage; and
tuning a transconductance of the full-duplex driver based on the determined hybrid leakage voltage to vary an output impedance of the full duplex driver in accordance with load variations in a load of the transceiver.

17. The method of claim 16, further comprising extracting the hybrid leakage voltage from the transmitter voltage and the hybrid voltage.

18. The method of claim 17, further comprising performing correlation of the transmitter voltage and the hybrid voltage to extract a polarity of the hybrid leakage voltage.

19. The method of claim 16, determining the hybrid leakage voltage from an echo canceller.

20. The method of claim 16, where the tuning comprises driving the hybrid leakage voltage towards zero to match an impedance of the transceiver with the load, the load comprising at least one of a line and a link partner.

* * * * *